(12) United States Patent
Nelson

(10) Patent No.: US 6,292,838 B1
(45) Date of Patent: Sep. 18, 2001

(54) TECHNIQUE FOR AUTOMATIC REMOTE MEDIA ACCESS CONTROL (MAC) LAYER ADDRESS RESOLUTION

(75) Inventor: William Joseph Nelson, Auburn, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/379,389

(22) Filed: Aug. 23, 1999

(51) Int. Cl.[7] .......................... G06F 15/16; G06F 15/173
(52) U.S. Cl. .......................... 709/236; 709/238; 709/245
(58) Field of Search .................................. 709/236, 238, 709/242, 223, 224, 245

(56) References Cited

U.S. PATENT DOCUMENTS

| | | | |
|---|---|---|---|
| 5,708,654 | * | 1/1998 | Arndt et al. .......................... 370/242 |
| 5,920,566 | * | 7/1999 | Hendel et al. ........................ 370/401 |
| 5,920,699 | * | 7/1999 | Bare ................................. 395/200.55 |
| 5,926,463 | * | 7/1999 | Ahearn et al. ........................ 370/254 |
| 6,055,236 | * | 4/2000 | Nessett et al. ........................ 370/389 |
| 6,199,122 | * | 3/2001 | Wilson ................................. 709/227 |

* cited by examiner

Primary Examiner—Glenton B. Burgess
Assistant Examiner—Tod Kupstas
(74) Attorney, Agent, or Firm—Weingarten, Schurgin, Gagnebin & Hayes LLP (57) ABSTRACT

A system and method for determining a MAC layer address of a network interface on a remote device, based on an IP address associated with the same network interface on the remote device. The disclosed system identifies an internetworking device, for example a router, that is attached to the remote subnet to which the network interface of the remote device is attached. The system identifies the network interface of the router that is attached to the remote subnet, and obtains the MAC address of that network interface from an address resolution protocol (ARP) cache associated with it. The system transmits a series of request packets having an IP destination address equal to the provided IP address of the remote device, each including a time to live value, indicating a maximum number of network hops over which each particular packet may be forwarded. The time to live values of the request packets result in each successive request packet being forwarded one hop further along the path to the remote device. The internetworking devices along the route to the remote device each receive one request packet that cannot be forwarded because the time to live value has been decremented to zero. As a result, each internetworking device along the route returns a reply packet to the requesting device indicating its IP address.

19 Claims, 6 Drawing Sheets

TECHNIQUE FOR AUTOMATIC REMOTE MEDIA ACCESS CONTROL (MAC) LAYER ADDRESS RESOLUTION

CROSS REFERENCE TO RELATED APPLICATIONS

N/A.

STATEMENT REGARDING FEDERALLY SPONSORED RESEARCH OR DEVELOPMENT

N/A.

BACKGROUND OF THE INVENTION

The present invention relates generally to communication networks, and more specifically to a system and method for determining a Media Access Control (MAC) layer address responsive to an Internet Protocol (IP) layer address.

The complex maintenance, configurations and troubleshooting requirements of computer networks and communications systems are often the responsibility of a person known as a network manager. Various automated tools are available to assist network managers, and are referred to generally as network management systems. The guidelines which define the allocation of network resources and services are referred to as network management policies. Network management policies, for example, define how devices are to be configured, and/or which users or devices are authorized to use which network resources, and the relative priorities of various devices.

In existing systems, network management policies are sometimes applied on a per-address basis. Addresses used in packets transmitted over computer networks are often described with relation to layers of the International Standards Organization (ISO) Model for Open Systems Interconnection (OSI), sometimes called the OSI reference model. Two layers of the OSI reference model that are typically associated with address information are the data link and network layers. The data link layer is often considered to be divided into two sublayers: a logical link control (LLC) layer and a media access control (MAC) layer. MAC layer address information of a packet typically consists of a source MAC address and a destination MAC address. Source and destination MAC addresses are used within what is commonly referred to as the local "subnet". When a packet passes through multiple subnets between its source and destination, typically by way of internetworking devices such as routers, the packet is said to go through many "hops" along its route. Source and destination MAC addresses are generally carried over a single "hop" within the potentially multi-hop route to a packet's ultimate destination. MAC layer addresses are therefore an example of "single hop" or "point to point" address information. A MAC layer address is usually statically associated with an individual network interface of a device, for example as stored within a non-volatile memory of a network interface card.

Network layer addresses, in contrast, are carried from the packet's originating system all the way to the packet's ultimate destination, potentially over multiple subnets or "hops". For example, internetworking protocol (IP) packets include IP source and destination addresses that are preserved from the originating system all the way to the ultimate destination of the packet. Network layer addresses are therefore considered to be "end to end" addresses. During operation of existing systems, a given IP address is typically associated, either dynamically or statically, with a single network interface of a particular device.

In existing network management systems employing address-based network management policies, a request to use a given network service is granted or rejected based on the privileges or level of service associated with a source address contained in the request. With regard to using MAC addresses for this purpose, a problem arises due to the way routers process IP packets. Specifically, when a router forwards a packet from a host on one subnet to a host or a router on another subnet, the router overwrites the packet's original source MAC address with the MAC address of the router's egress interface. Thus, a MAC address of a given network interface is only visible in packets received on the subnet to which the network interface is directly attached, sometimes referred to as the "local subnet". If a server is not located on the same subnet as the clients to which it provides services, source MAC addresses in service requests cannot be guaranteed to be MAC addresses of the systems from which the requests originated. This makes it difficult for a server to determine the system which originated the request. Accordingly, a MAC address based network management policy is problematic in an enterprise network with many subnets.

At least one existing network management system has enabled a network manager to locate a device having a particular MAC address within the network, and to determine an IP address that is currently associated with that MA7 address. However, this system collects address data by periodically polling all network devices in the network. Address data collected by this system could, therefore, be as old as tie polling interval. Since this method for collecting data is relatively timely-consuming and bandwidth intensive, it is not feasible for such a system to obtain current address information in real-time. Accordingly, this type of existing system cannot be used to perform efficient and effective real-time trouble shooting of problems related to a particular user's network layer address.

Additionally, future versions of cable television set-top boxes and other home networking products may be IP based. It may also be desirable for service providers to be able to identify a particular customer by the MAC address of the customer's home networking device. For example, when a customer initiated a request for a "premium" service, the service provider would need to identify the MAC address of the requesting customer's network interface device, through the source IP address within the request, in order to bill the customer for the requested service.

Finally, existing address-based network policies in general do not permit allocation of resources on a per-user basis. This arises from the fact that multiple users may be associated with either a single MAC or IP address. For example, a shared system in a guest office or library may be used by different users at different times. Additionally, IP addresses are often dynamically allocated when a user logs into a network enabled system. For these reasons, a single statically allocated IP address may be associated with different users at different times, and different dynamically allocated IP addresses may be used by a single user for different sessions on a single system. Network management policies based on specific users have, therefore, been difficult to support.

For the reasons outlined above it would be desirable to have a system for identifying, given an IP address, a MAC layer address associated with a network interface of a remote system with which that IP address is also associated. The system should enable a network management system or network manager to identify the MAC address of a network interface that originated a service request message, based on a source IP address within the request. The system should be capable of operating at any location with respect to the originating system or device. In particular, the system should be capable of obtaining a MAC address of a network interface on a remote system, for which an IP address is known.

BRIEF SUMMARY OF THE INVENTION

A system and method for determining a MAC layer address of a network interface on a remote device is disclosed, which operates using an IP address associated with the same network interface of the remote device. The disclosed system identifies an internetworking device, for example a router, that is attached to the remote subnet to which the network interface of the remote device is attached. The system identifies the network interface of the router that is attached to the remote subnet, and obtains the MAC address of that network interface from an address resolution protocol (ARP) cache that is associated with it.

In an illustrative embodiment, the disclosed system responds to a request for a MAC address corresponding to a provided IP address by transmitting a series of request packets having an IP destination address equal to the provided IP address. The request packets each include a time to live value, indicating a maximum number of network hops over which each particular packet may be forwarded. The time to live values of the request packets are each incremented by one with respect to the time to live value of the preceding request packet. Each successive request packet is accordingly forwarded one hop further along the path to the remote device, until the remote device itself is reached by the last request packet.

The internetworking devices along the route to the remote device each receive one request packet that cannot be forwarded because the time to live value equals zero after it has been decremented. Upon detection of such a request packet, each internetworking device along the route returns a reply packet to the requesting device that indicates an IP address of the interface on which the request packet was received. Finally, the remote device itself receives the last request packet, and returns a reply packet that indicates the request was received at the remote device. In this way the requesting device forms a list of routers along the route to the remote device, including the router which is attached to the subnet to which the remote device is directly connected.

The disclosed system then identifies the network interface of the last internetworking device along the route to the remote device that is coupled to the remote subnet to which the interface of the remote device is also coupled. The system then accesses a cache of MAC layer addresses within the last internetworking device to determine a MAC address of the network interface of the remote device that is associated with the same IP address as provided in the original request.

In this way a system is disclosed which identifies, given an IP address, a MAC layer address associated with a network interface of a remote system with which the given IP address is also associated. The disclosed system enables a network management system or network manager to identify the MAC address of a network interface that originated a service request message, based on a source IP address contained within the service request. The disclosed system is capable of operating at various locations with respect to the remote system or device.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
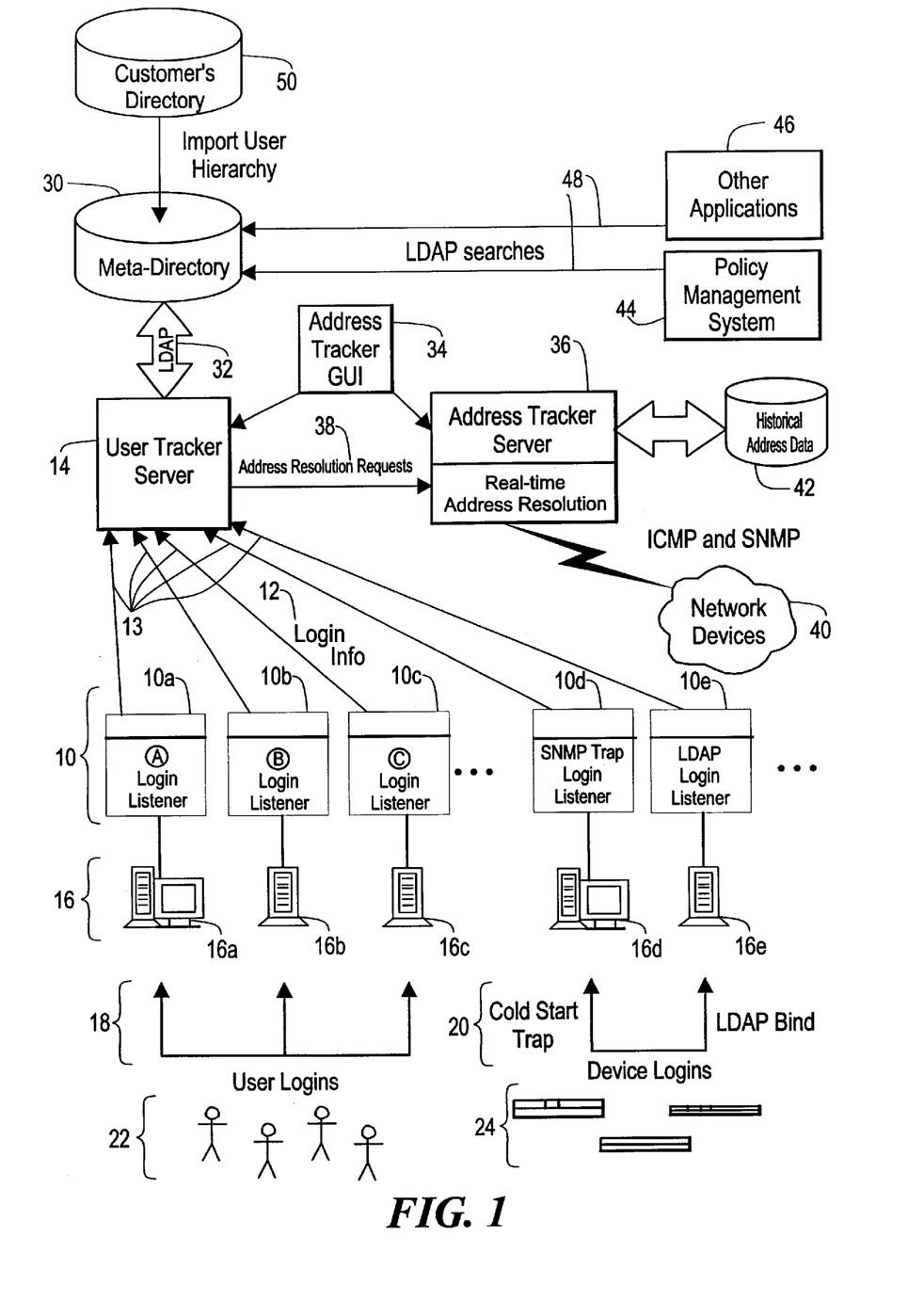
FIG. 1 is a block diagram showing an illustrative embodiment of the disclosed system.

As shown in FIG. 1, in an illustrative embodiment, the disclosed system includes a number of login listeners 10, which operate to detect login and/or logout events related to corresponding services provided by the server systems 16. Each one of the login listeners 10 monitors a communication network to which a corresponding one of the server systems 16 is attached. In response to detection of a login or logout event, a login listener provides login information 12, over one of the connections 13 to a user tracker 14. The login and/or logout events represent successful logins 18 or logouts by users 22. The login and/or logout events also include operations 20 performed by network devices 24 to "login" or "logout" with regard to the network itself. The user events 18 and device events 20 may be associated with and/or trigger user-based or device-based network management policies, respectively.

In the illustrative embodiment, the login listener A 10a monitors and detects successful user logins to a Windows NT Domain Controller service, shown as server 16a. The login listener 10b monitors and detects logins to a Novell NDSTM server 16b, and the login listener C 10c monitors and detects device logins to a RADIUS (Remote Authentication Dial In User Service) server 16c.

Further, for purposes of illustration, the login listener 10d listens for SNMP (Simple Network Management Protocol) Trap messages sent to an Open Management Platform server 16d, which reflect cold start traps performed by the network devices 24, while login listener 10e listens for LDAP (Lightweight Directory Access Protocol) logins to a network management policy server 16e, which reflect LDAP Bind operations performed by the network devices 24.

Other illustrative login listeners which monitor login and/or logout events related to the user logins 18 include login listeners for detecting logins to UNIX NIS (Network Information Service) servers, as well as login listeners to detect logins to Windows servers. Other illustrative Login listeners for detecting device logins 20 include a logic listener to detect logins to a COPS (Common Open Policy Service) server. Many other types of login listeners are possible for technologies which enable the automatic detection of new devices and servers within the network. Examples include login listeners for the Jini™ connection technology of Sun Microsystems, Inc., as well as for the Plug and Play™ technology of Microsoft Corporation.

Login or logout events associated with the server systems 16 are detected by the login listeners 10, for example using notification provisions of security audit log APIs associated with corresponding services provided by the server systems 16. In an alternative embodiment, login or logout events are detected in the login listeners 10 by listening on one or more network interfaces for packets, cells or messages indicating that a successful login or logout has occurred for a specific service. Other login listeners may use other techniques for detecting when users and/or devices login or logout.

During operation of the system shown in FIG. 1, the user tracker server 14 processes login information received from the various login listeners 10. The user tracker server 14 maintains a "white pages"-like directory of network users, shown as the meta-directory 30, based on the login information it receives. The meta-directory 30 provides an interface to other application programs that permits such applications to map a MAC or an IP address to a fully distinguished name which uniquely identifies a person or network device that is currently logged onto one or more network services and using that address. In addition, the fully distinguished name may reflect geographic information regarding users that enables an application to determine a user's likely location within the network. The disclosed system provides the basis for network management policies that are user or device based, as implemented through a policy management system 44.

As illustrated in FIG. 1, an address tracker application 36, including an address tracker server and real-time address resolution service, together with an address tracker GUI (Graphical User Interface) 34, operate in connection with login information provided by the user tracker server 14 to identify particular users or devices associated with particular addresses. The address tracker application 36 further maintains a collection of historical address data 42 which reflects past associations between IP and MAC addresses, as well as the locations (device and port) where the addresses were seen. The user tracker server 14 may itself rely on a service of the address tracker server 36 to process address resolution requests 38, for example in order to determine a MAC address that is currently associated with a given IP address.

The user tracker server 14 interfaces to the meta-directory 30 through an LDAP interface 32. The meta-directory 30 also provides interfaces for LDAP searches by the policy management system 44 and other applications 46. Other applications 46, for example, use the information in the meta-directory 30 to display user names involved in a particular network conversation, and/or to automate the configuration of user-based, as opposed to MAC address-based, virtual local area networks (VLANs).

The meta-directory 30 itself initially imports user account information for a number of network services from a customer's directory 50. The meta-directory is, for example, capable of replicating user information hierarchies from customer enterprise directories, such as Novell's NDS (Novell Directory Services), Siemens X.500 Directory, Microsoft's Active Directory™ or Netscape's Directory Server™. For each enterprise network user (or network device) the meta-directory stores the user's common name, as well as a list of login names for respective network services. For each login session associated with a user entry, the meta-directory 30 stores the following information:

Login Name—the login name used for this session

Confidence Index—relative confidence of user identity

Login Type—the type of service

Login Date—date and time of login

Logout Date—date and time of logout

End Station Name—name of computer used by the user

IP Address—IP address of the user's end station interface at the time of login

MAC Address—MAC address of user's end station network interface at time of login Network Device—Network device (switch/repeater) attached to the network to which the user's end station is attached; most likely a layer 2 device (bridge), but may alternatively be a layer 3 device (router)

Network Device if index—SNMP ifindex (interface index) value corresponding to the interface on the Network Device at which the MAC address of the network interface on the user's end station was last sees Default Gateway—The user's end station's default gateway router Default Gateway ifIndex—Index of the interface on the Default Gateway router where the user's end station's MAC address was last seen.

Figure 2:
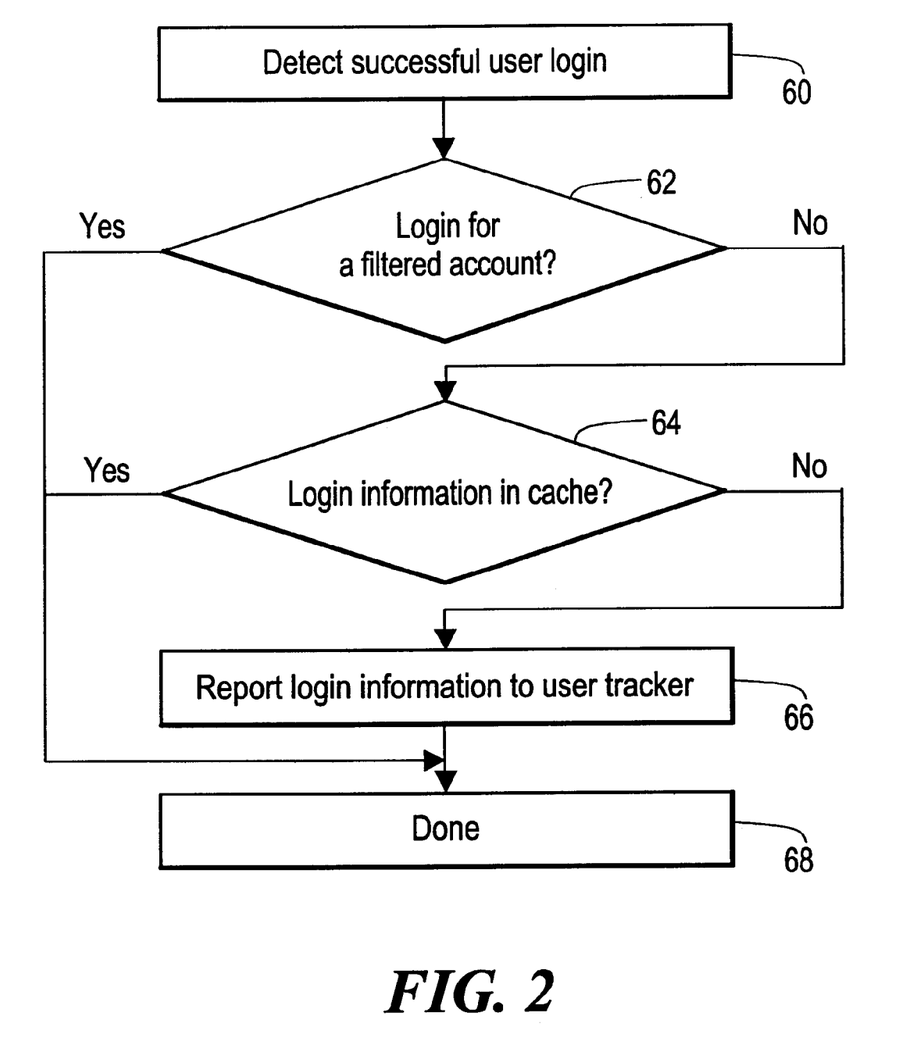
FIG. 2 is a flow chart showing steps performed by a login listener system.

FIG. 2 shows steps performed by an illustrative embodiment of a login listener. Numerous types of login listeners can be provided; i.e., one for each type of supported network service. Additionally, multiple instances of a given login listener type can be installed on various server machines throughout the enterprise. At step 60, the login listener detects a successful user login. Next, at step 62, the logic listener determines whether the login detected at step 60 is for an account whose login events are filtered, and which may therefore be ignored. The list of filtered accounts includes shared accounts such as root, administrator, and guest accounts. Activities involving shared accounts are typically not useful to track for purposes of associating specific users with address or other login information. If the detected event is for a filtered account, step 62 is followed by step 68, and processing of the event detected at step 60 is complete. Otherwise, step 62 is followed by step 64.

At step 64, the login listener determines if the login information associated with the login event detected at step 60 is currently stored in a cache of previously reported login information. If so, then no reporting of the event is made to the user tracker server 14, since the associated login information has already been reported. In that case, step 64 is followed by step 68. Otherwise, step 64 is followed by step 66.

Any caching of login information within the login listener is completely configurable. For example, the cache may have a configurable size and cache entry time out parameters. A first illustrative login listener cache is configured to store the most recent login event of each user, and to notify the user tracker server 14 only when a login event is detected having new login information for a particular user. In another illustrative embodiment, the login listener cache is configured so that for each user, current login information is forwarded to the user tracker once per predetermined time period, such as once a day. Various other configurations could be provided based on the network management needs of each particular enterprise or customer.

At step 66 the login listener reports login information associated with the login event detected at step 60 to the user tracker server 14. The login information includes the login name used to log into the service, the type of login (service type), the date and time of the login, a name of the computer used by the user to log into the service, the IP address of the source of the service request, and a confidence index. The confidence index is a value representing the relative strength of the authentication mechanism used on the server with which the user has established a session. For example, a login to a Windows NT version 5 server, using the Kerberos version 5 authentication protocol may be assigned a higher confidence index than a login to a Windows NT version 4 server, using the Challenge/Response authentication protocol. Similarly, successful logins to services using the relatively robust Kerberos authentication protocol may receive higher confidence index values than logins to services which transmit unencrypted passwords, such as TELNET.

The confidence index for a given session is used by the policy management system 44 when deciding whether or not to honor security policy-related service requests on behalf of the associated user. For example, a user may initially set up a session with a particular server. The initial level of service provided to the user is relatively low, providing basic access only. Subsequently, the user may request a higher level of service. The requested higher level of service may, for example, have potential security policy implications.

Accordingly, the subsequent service request is processed through the policy management system, which accesses the confidence index associated with the initial session, and possibly confidence indices associated with other sessions of the same user, to determine whether the request for a higher service level should be granted.

Figure 3:
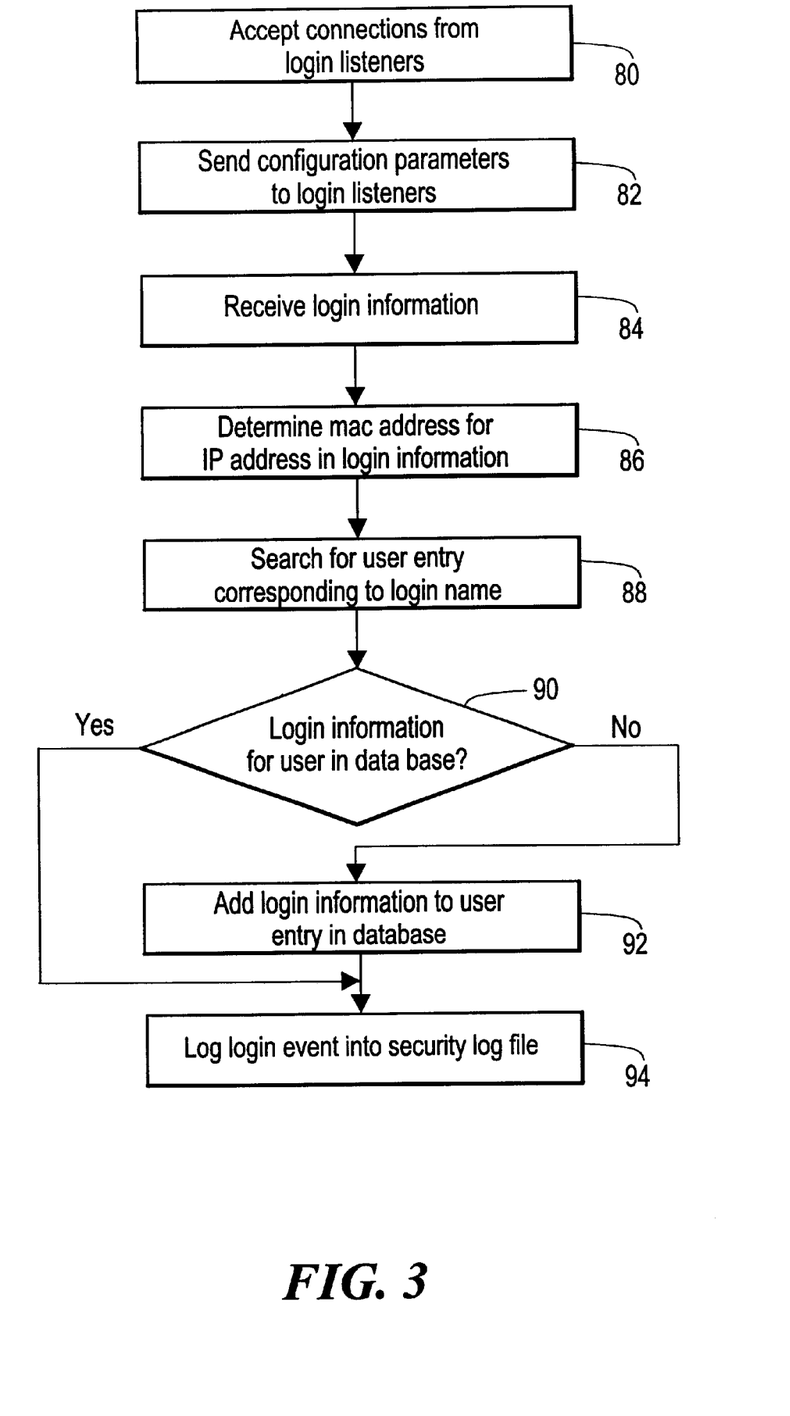
FIG. 3 is a flow chart showing steps performed by a user tracker server.

FIG. 3 shows steps performed in an illustrative embodiment of a user tracker server. The user tracker server is generally responsible for collecting and processing login information received from the login listeners. At step 80, the user tracker server listens for and accepts connections from various login listeners, for example TCP connections, or any other type of network connection which features reliable message delivery. Following step 80, at step 82, the user tracker server sends configuration information to the login listeners with which it formed connections at step 80. Configuration information includes, for example, cache entry time out periods, indication of whether or not to track logout events as well as login events, how large of a cache, if any, is to be used to store received login information, how often to report or update received login information with regard to any one particular session or user, and/or how generally to handle receipt of duplicate login information.

Figure 6:
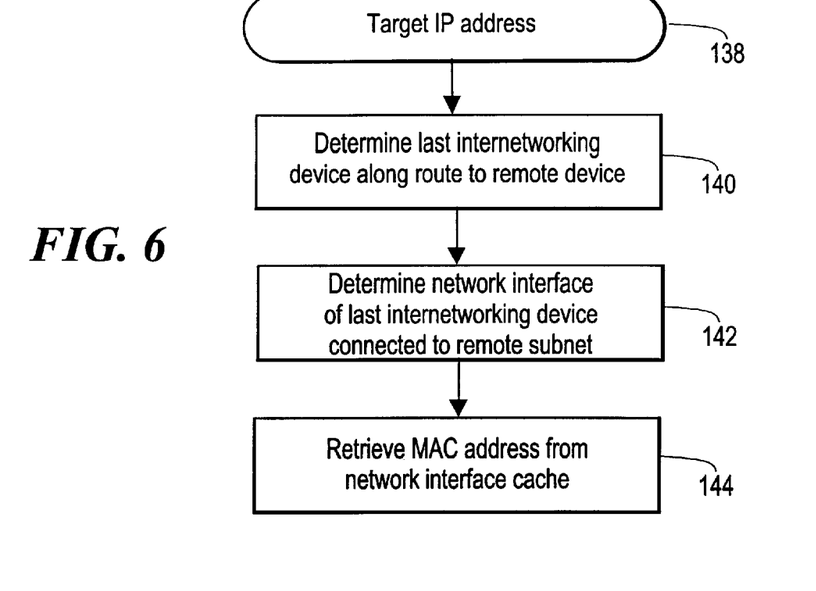
FIG. 6 is a flow chart showing steps performed to determine a MAC layer address from a target IP layer address.
Figure 7:
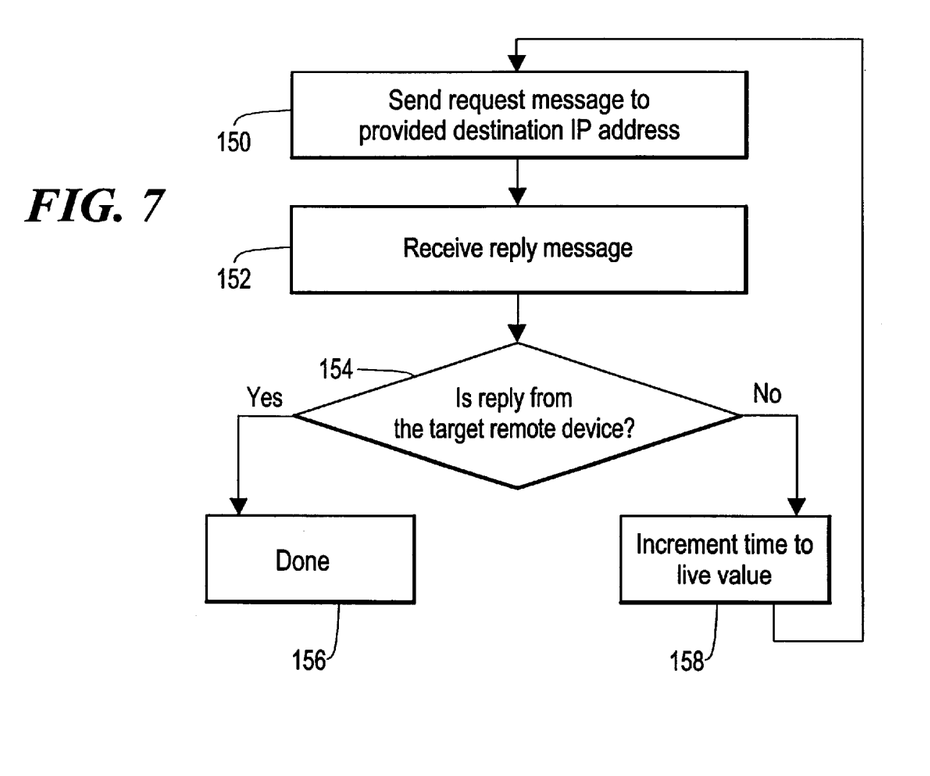
FIG. 7 is a flow chart showing steps performed to determine a last internetworking device along a route to a target remote device.
Figure 8:
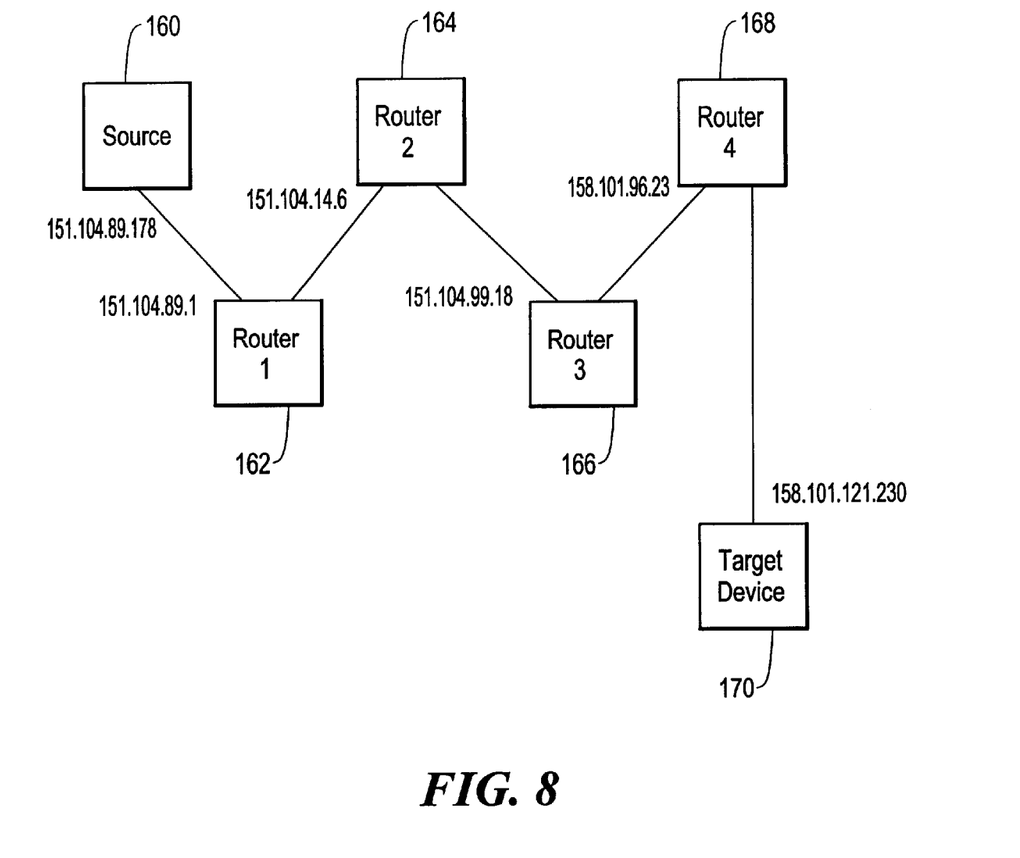
FIG. 8 is a block diagram of an illustrative network configuration used to describe the operation of the disclosed system.

At step 84, the user tracker server receives a set of login information from one of the login listeners. Then, at step 86, the user tracker server determines a MAC layer address corresponding to an IP address contained in the login information, for example by way of a real-time address resolution function within an address tracker server. FIGS. 6–8 describe in greater detail the disclosed system for determining a MAC layer address corresponding to an IP address.

At step 88, the user tracker server searches the meta-directory for a user entry associated with a login name contained in the login information received at step 84. If the login name in the login information does not match a login name associated with any user entry in the meta-directory, the user tracker may provide an indication to the meta-directory reporting the event, which would in turn cause the meta-directory, at some point in time, to load or reload login names and user names from customer directories of service account information. In general, the mappings of login names to users in the meta-directory are provided from such customer directories by a process of importing service account information from user account directories associated with specific service types. For example, in an enterprise network including Lotus Notes™ servers, the login names of users having Lotus Notes accounts would be downloaded into the meta-directory, together with the common names of the corresponding users. Alternatively, the common names of the users for the Lotus Notes accounts could be entered separately into the user tracker server 14, for example by the network manager.

The user entry located in the meta-directory at step 88 is examined at step 90 to determine whether the login information received at step 84 has already been stored. In an illustrative embodiment, the user tracker server determines whether the user entry determined at step 88 is currently associated with both the IP address in the login information at step 84 and the MAC layer address determined in step 86. If the user entry does not include login information associating the user entry with both addresses, then step 90 is followed by step 92, in which the login information received at step 84 is entered as a session entry within the user entry identified at step 88. Otherwise, step 90 is followed by step 94, in which the login information received at step 84 is entered into a security log file. Step 92 is also followed by step 94, so that all login and/or logout events are recorded into the security log file.

Figure 4:
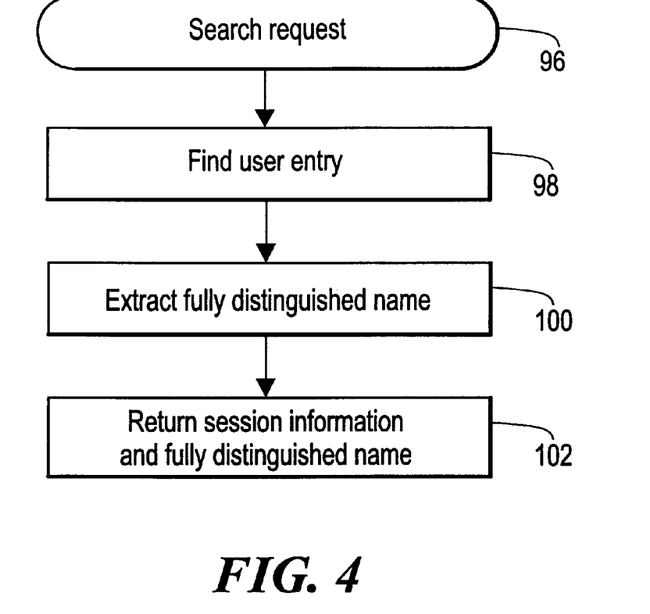
FIG. 4 is a flow chart showing steps performed by a meta-directory.

FIG. 4 is a flow chart showing steps performed by an illustrative embodiment of a meta-directory in response to receipt of a search request 96, and as would be performed responsive to the LDAP searches 48 as shown in FIG. 1. LDAP is described in detail in Request for Comments (RFC) 1777, all disclosures of which are hereby included by reference herein.

Figure 5:
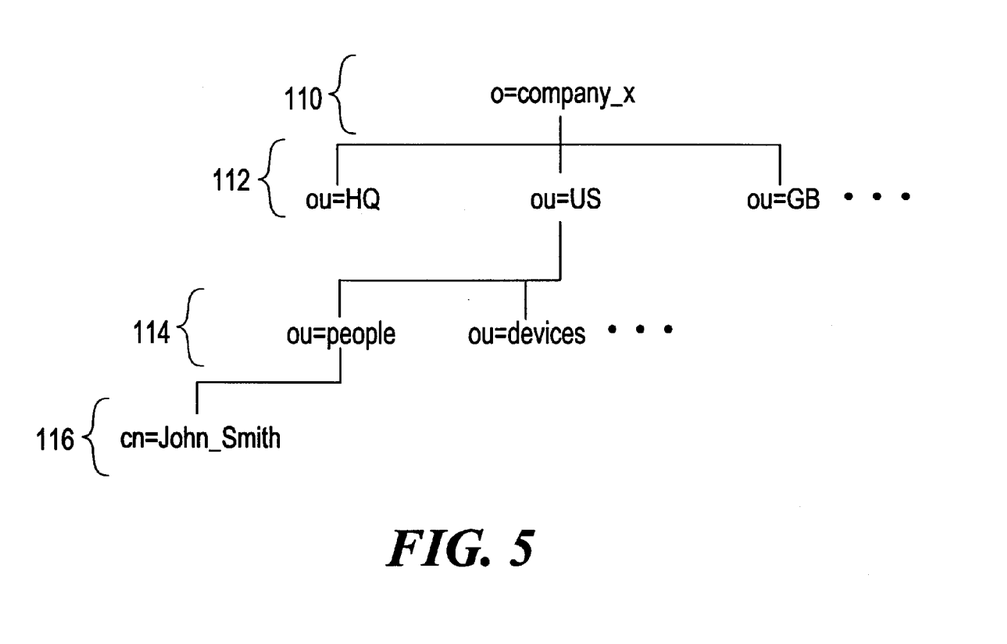
FIG. 5 is a tree structure used to organize entries in a meta-directory and to obtain a fully distinguished name.

At step 98, the meta-directory locates a user entry which is associated with a login name, common name, MAC address or IP address specified in the search request 96. An illustrative organization of the user entries within the meta-directory is shown in FIG. 5. At step 100, the meta-directory extracts a fully distinguished name from the user entry located at step 98. At step 102, the meta-directory returns the fully distinguished name determined in step 100, along with any session information associated with the user entry, including confidence indices.

FIG. 5 shows an illustrative organization of user entries within the meta-directory. As shown in FIG. 5, user entries are organized as leaves 116 in a hierarchical tree structure. The tree structure of FIG. 5 has a first (or "root") level 110 indicating the organization for which the entries are being stored, in this case identified as company_x. A second level 112 identifies the organizational units within the overall organization, for example HQ (for headquarters), U.S. (for United States), and GB (for Great Britain). Accordingly, all user entries stored within the HQ branch would be for employees of company_x who work at headquarters, all those entries within the U.S. branch would be for employees who work within the United States, and all those entries within the GB branch would be for employees that work in Great Britain. Each of the branches at level 112 is further divided into sub-branches 114, which for example differentiate entries that are associated with people, from those associated with devices. Other subdivisions at levels 112 and 114 would also be possible. The leaf level 116 is the level at which the individual user entries are stored. Each user entry has associated with it a common name of the user, which is used to distinguish that entry from all other user entries within the immediate sub-branch. For example, if there is only one person named John Smith within the U.S. organizational unit of company_x, then the user entry storing login information related to all service accounts of John Smith could use the string "John_Smith" as a unique common name. However, where there are two John Smiths within the U.S. employees of company X, one of the two would have to differentiate their common name from the other, for example by introduction of a distinguishing middle initial, resulting in "John_Q_Smith".

When login information is reported to the meta-directory, if it has not already been stored, a session entry is added to the user entry which is associated with the login name contained within the login information. When a request for information regarding a particular user, MAC address, or IP address is received by the meta-directory, the meta-directory returns all session entries, including confidence indices, associated with the user entry which matches the user, MAC address, or IP address information included in the request. In an illustrative embodiment, only information from the most recent session entry within the identified user entry is returned to the requester.

A fully distinguished name associated with the identified user entry is also returned to the requester. In the embodiment of FIG. 5, a fully distinguished name associated with a given user entry is formed by concatenating the hierarchical information that reflects the position of the entry within the hierarchical structure. For example, a request which mapped to the user entry having a common name of John_Smith would return a fully distinguished name of "company_x.us.people.John_Smith". Thus the hierarchical organization of user entries is used to provide a fully distinguished name associated with a user entry, where the fully distinguished name is unique across the entire meta-directory.

FIG. 6 is a flow chart showing steps performed to determine a MAC layer address from an IP layer address in an illustrative embodiment of the disclosed system. At step 138, the system receives a target IP address. The target IP address is an IP address associated with a network interface of a user's end station. In the embodiment shown in FIG. 6, the user's end station is not directly connected to the local subnet of the system at which a request for the MAC address associated with the target IP address is received. The user's end station is accordingly referred to as the "remote device" or "target device". Similarly, the network interface of the user's end station is referred to as the "target network interface". At step 140, the system determines an internetworking device, for example a router, that is the last internetworking device along a route to the target device. Step 140 is described in further detail in connection with FIG. 7.

At step 142, the system identifies a network interface of the last router along the route to the target device that is connected to the remote subnet to which the target device is also connected. At step 144, the system retrieves the MAC address associated with the same network interface that the target IP address is associated with from the ARP (Address Resolution Protocol) cache associated with the last internetworking device that is connected to the remote subnet to which the target network interface is also connected. ARP is a known protocol for mapping IP addresses to MAC addresses. A table, usually called the ARP cache, is associated with the network interfaces within a router, and is used to maintain a correlation between MAC addresses and corresponding IP addresses for network interfaces of other network devices in the subnet to which the router connected. ARP defines the protocol rules for establishing and maintaining these correlations, and providing address conversions from IP addresses to MAC addresses. The Reverse ARP protocol performs translations from MAC addresses to IP addresses.

The present system takes advantage of the fact that ARP software maintains IP address to MAC address mappings in its address cache during normal packet forwarding operations of a router. Specifically, when an incoming packet, destined for a network device on a specific subnet, arrives at a router, the router searches the ARP cache to find a MAC address that matches the IP address. If the router finds a corresponding MAC address, then the packet can be converted to include the new MAC address. If no corresponding MAC address is found for that IP address, ARP software broadcasts a request packet in a special format to all network devices on the attached subnet to see if a network device has the IP address associated with one of its interfaces. A network device that recognizes the IP address as being associated with one of its network interfaces returns a reply so indicating. ARP then updates the ARP cache for future reference. The router next transmits the received packet, converted so that it includes the MAC address of the responding network device as a destination MAC address. ARP protocol details differ for each type of local area network. Accordingly, there are separate ARP Requests for Comments (RFCs) for Ethernet, Asynchronous Transfer Mode (ATM), Fiber Distributed Data Interconnect (FDDI), and other protocols. For example, RFC 826 specifies the Ethernet ARP protocol.

FIG. 7 describes illustrative steps performed to determine a last internetworking device along the route to a target device. The steps shown in FIG. 7 may for example, be performed using the UNIX utility tool commonly referred to as "Traceroute". At step 150, a request packet is generated and transmitted having a destination IP address equal to the target IP address. The request packet may, for example, be an ICMP (Internet Control Message Protocol) Echo Request packet or, alternatively, a UDP (User Datagram Protocol) probe packet. The system writes a time to live value of 1 into the initial request packet. The initial request packet is received by the first internetworking device along the route to the target device. The receiving internetworking device is, for example, a router. The receiving router decrements the time to live value, and the resulting zero value indicates that the packet cannot be forwarded. The router accordingly sends back a reply message to the system which originated the request packet, indicating that the request packet was dropped, and including an IP address of the router that dropped the packet. In the case where the request packet did not reach the remote device, the reply packet is an ICMP Time Exceeded packet.

Upon receipt of the reply packet at step 152, the system determines whether the reply packet is from the target device at step 154. In a first embodiment, the system determines that the reply packet is from the remote device if the reply packet is an ICMP Echo reply packet. In an alternative embodiment, the system determines that the reply packet is from the remote device if the reply packet is an ICMP "port unreachable" packet. In another alternative embodiment, the system determines that the reply packet is from the target device if the IP source address of the reply packet matches the target IP address.

If the system determines that the reply packet is from the remote device, then step 154 is followed by step 156. In that case the requesting device has recorded the IP addresses of each router along the route between the disclosed system and the remote device. Moreover, at this point the reply packet has been sent by the remote device through the last router along the route to the remote device, back to the requesting device on which the disclosed system is, executing. When the last router along the route received that reply packet, it updated its ARP cache to include a mapping between the target IP address and the MAC address of the target network interface on the target device. This updated and relatively current mapping may then be accessed by the system as described above in connection with steps 142 and 144 of FIG. 6.

If the system determines at step 154 that the received reply packet was not originated at the target device, because, for example, the reply packet is an ICMP Time Exceeded packet, then the system knows that the reply packet was generated by a router along the route to the target device, and step 154 is followed by step 158. At step 158, the system increments the time to live value from that which was included in the previously transmitted request packet. For example, the initial request packet's time to live value would be incremented from 1 to 2 for the second request packet at step 158. When the incremented time to live value exceeds a predetermined limit, the target system is determined to be unreachable.

Step 158 is followed by step 150, and a new request packet is transmitted, for example, having a time to live value of 2, and again having the provided target IP address as a destination IP address. The second request packet is received at the first router along the route to the target device, which again decrements the time to live value, this time resulting in a value of 1. The first router forwards the second request packet to the second router along the route to the target device, which decrements the time to live value to zero, thereby determining that the request packet cannot be forwarded. The second router then sends a reply packet back to the requesting device, indicating that the request packet was dropped, and including the IP address of the second router. In this manner, steps 150, 152, 154 and 158 are repeated until a reply packet is received which indicates that the request packet was received by the target device.

An illustrative configuration of network devices is shown in FIG. 8, in connection with which is described processing of a request for a MAC address associated with a target network interface of target device 170. The target IP address of the target device 170 is 158.101.121.230. Illustrative IP addresses along the route to the target device, as determined by the disclosed system running on a source network device 160, are as follows:

Source device: 151.104.89.178
Router 1 162: 151.104.89.1
Router 2 164: 151.104.14.6
Router 3 166: 151.104.99.18
Router 4 168: 158.101.96.23
Target Device: 158.101.121.230

The last router along the route from the source 160 to the target device 170 is Router 4 168. The IP address of the network interface to Router 4 168 along the route from the source network device 160 to the target device 170 is 158.101.96.23. This is not the IP address for the network interface of the router that is connected to the remote subnet on which the target network interface is connected. However, this IP address (158.101.96.23) of Router 4 168 may be used to access a Simple Network Management Protocol (SNMP) software agent executing within Router 4 168 in order to determine IP addresses of other network interfaces of Router 4 168. Because Router 4 168 is the last router along the route to the target device, Router 4 168 must have another network interface that is connected to the subnet to which the target interface is connected.

The IP address for the network interface of Router 4 168 that is connected to the subnet to which the target network interface is also connected is obtained bad issuing an SNMP Get ipRouteIfIndex command to the SNMP agent within the Router 4 168. To perform this command, the present system first determines the SNMP "read community" string of the router, which is the SNMP read-access password necessary to read the SNMP data structures controlled by the SNMP agent. The read community string may be, for purposes of example, obtained through an Open Management Platform (OMP) service such as Hewlett Packard's OpenView™, or from a vendor specific network management product such as 3Com Corporation's Transcend™.

The disclosed system identifies the specific network interface of Router 4 168 that is on the 158.101.121.0 subnet by accessing an SNMP Management Information Base version 2 (MIB II) stored within Router 4 168 to determine an "interface index" (ifIndex) value associated with that interface. The ifIndex value associated with the desired interface is obtained through an ipRouteIfIndex object within an ipRouteTable structure, which is also defined within the SNMP MIB II data structure. In order to accomplish this, the disclosed system first determines the network address within the target IP address. As it is generally known, any IP address includes a host address and a network address. The network address of the target IP address is also referred to as the "route destination address" of the remote subnet to which the target interface is connected. The route destination address must be obtained in this case because the ipRouteTable structure must be indexed using a route destination address value, and not simply using the full target IP address.

The route destination address of the remote subnet to which the target device is connected is obtained by logically ANDing the target IP address with the appropriate subnet mask. The system may require the user to supply the appropriate subnet mask with the target IP address. Several alternative approaches may be employed to determine the route destination address. They include:

Querying the IP topology database of an OMP server to determine the subnet to which the target device is connected;

Using trial and error by applying common subnet mask values to the target IP address. This may be accomplished by first applying the subnet mask 255.255.255.0. If the resulting value, when applied as an index to the SNMP ipRouteIfIndex structure, returns a valid ifindex value, then the attempt was successful. Otherwise, if an error is returned, then the least significant binary '1' in the subnet mask is cleared, resulting in a value of 255.255.254.0, and applying the mask to the target IP address. If the result still fails to provide a valid ifIndex value, then the next least significant bit in the subnet mask is cleared, and the process repeated until a valid ifIndex is obtained.

In the configuration of FIG. 8, the route destination address is 158.101.121.0. It is, for purposes of example, obtained by logically ANDing the target IP address 158.101.121.230 with the subnet mask 255.255.255.0. With the route destination address known, the following SNMP request may be issued:

SNMP Get ipRouteIfIndex.158.101.121.0

The above request, for purposes of example, returns a value of 8, which is the ifindex value for the network interface of Router 4 168 on the 158.101.121.0 subnet.

Next, in order to determine the MAC address of the target network interface, the system uses the ipNetToMediaPhys- Address MIB object from ipNetToMediaTable associated with Router 4 168. The ipNetToMediaTable structure is the Address Resolution Protocol (ARP) cache for the Router 4 168. The ifIndex value determined in step 142 of FIG. 6 and the target IP address 158.101.121.230 are the indices to the ipNetToMediaTable. In the example of FIG. 8, where the ifindex is 8, and the target IP address is 158.101.121.230, the following SNMP command:
SNMP Get ipNetToMediaPhysAddress.8.158.101.121.230 returns a MAC address, for example, 00C04FC2C2CE84, which is the MAC address of the target network interface on the target device.

The functions herein described can be implemented in many forms, including one or more Application Specific Integrated Circuits or any other suitable hardware implementation, or some combination of hardware components and software. Where a portion of the functionality is provided using software, that software may be provided to the computer in many ways; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media, for example, using baseband or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method of determining a point to point address associated with a network interface of a remote device, responsive to an end to end address associated with said network interface of said remote device, comprising:

detecting login information including said end to end address associated with said network interface of said remote device, wherein said remote device is a remote end station, and wherein said login information further includes information identifying a user of said remote end station;

extracting, responsive to said detecting of said login information, said end to end address associated with said network interface of said remote device from said login information;

identifying, responsive to said end to end address, an internetworking device communicably coupled to a remote network to which said network interface is also communicably coupled;

identifying, responsive to said end to end address, an interface of said internetworking device which is attached to said remote network; and obtaining, responsive to said end to end network address, said point to point address of said network interface from a database of point to point addresses of network interfaces of devices that are communicably coupled to said remote network, wherein said database is associated with said interface of said internetworking device attached to said remote network.

2. The method of claim 1, wherein said point to point address is a data link layer address.

3. The method of claim 1, wherein said point to point address is a media access control (MAC) layer address.

4. The method of claim 1, wherein said to end address is a network layer address.

5. The method claim 1, wherein said end to end address is a internet protocol (IP) layer address.

6. The method of claim 1, wherein said step of identifying an internetworking device communicably coupled to said remote network to which said network interface is also communicably coupled further comprises:

transmitting a plurality of request packets, each of said request packets including a network layer destination address equal to said end to end address, each one of said request packets further including a corresponding maximum hop count value indicating a maximum number of hops said one of said plurality of request packets may be transmitted over;

receiving respective ones of said plurality of request packets at each of at least one internetworking device located along a route to said remote network;

determining, at each of said at least one internetworking device located along said route to said remote network, responsive to said maximum hop count value indicating said maximum number of hops said respective one of said plurality of request packets may be transmitted over, that said respective one of said plurality of request packets cannot be forwarded;

transmitting, at each one of said at least one internetworking device located along said route to said remote network, responsive to said determining that said respective one of said plurality of request packets cannot be forwarded, a response packet including an end to end address of said one of said at least one internetworking device along said route to said remote network; and identifying said internetworking device communicably coupled to said remote network to which said network interface is also communicably coupled, responsive to receipt of said response packet from each one of said at least one internetworking device located along said route to said remote network.

7. The method of claim 6, wherein said request packets comprise Internet Control Message Protocol (ICMP) echo request packets.

8. The method of claim 7, wherein said reply packets comprise ICMP echo reply packets.

9. The method of claim 6, wherein said plurality of request packets comprise UDP probe packets.

10. The method of claim 9, wherein said rely packets comprise ICMP port unreachable packets.

11. The method of claim 6, wherein said transmitting said plurality of request packets further comprises generating an incremented maximum hop count value for each successive one of said plurality of request packets.

12. The method of claim 6, further comprising:

receiving a respective one of said plurality of request packets at said network interface of said remote device;

determining, at said remote device, responsive to said maximum hop count value, that said respective one of said plurality of request packets cannot be forwarded;

transmitting, at said remote device, responsive to said determining that said respective one of said plurality of request packets cannot be forwarded, a response packet including said end to end address of said network interface of said remote device; and wherein said identifying said internetworking device communicably coupled to said remote network to which said network interface is also communicably coupled, is further responsive to receipt of said response packet from said remote device.

13. The method of claim 1 wherein said identifying said interface of said internetworking device further comprises:
   determining an address of said remote network; and
   using said address of said remote network to determine said interface of said internetworking device.

14. The method of claim 13, wherein said determining said address of said remote network includes performing a logical AND operation with said end to end address of said remote device and a subnet mask of said remote network.

15. The method of claim 1, wherein said remote network is a subnet.

16. The method of claim 1, wherein said step of obtaining said point to point address of said network interface from said database of point to point addresses of network interfaces of devices that are communicably coupled to said remote network comprises accessing an address resolution protocol cache.

17. The method of claim 16, wherein said step of obtaining said point to point address of said network interface from said database of point to point addresses of network interface of devices that are communicably coupled to said remote network comprises issuing a simple network management protocol (SNMP) get request command.

18. A computer program product including a computer readable medium, said computer readable medium having a computer program for determining a point to point address associated with a network interface of a remote device responsive to an end address associated with said network interface of said remote device stored thereon, said computer program comprising:
   program code for detecting login information including said end to end address associated with said network interface of said remote device, wherein said remote device is a remote end station, and wherein said login information further includes information identifying a user of said remote end station;
   program code for extracting, responsive to said detecting of said login information, said end to end address associated with said network interface of said remote device from said login information;
   program code for identifying, responsive to said end to end address, an internetworking device communicably coupled to a remote network to which said network interface is also communicably coupled;
   program code for identifying, responsive to said end to end address, an interface of said internetworking device which is attached to said remote network; and
   program code for obtaining, responsive to said end to end network address, said point to point address of said network interface from a database of point to point addresses of network interfaces of devices that are communicably coupled to said remote network, wherein said database is associated with said interface of said internetworking device attached to said remote network.

19. A computer data signal embodied in a carrier wave, said computer data signal including a computer program for determining a point to point address associated with a network interface of a remote device responsive to an end address associated with said network interface of said remote device, said computer program comprising:
   program code for detecting login information including said end to end address associated with said network interface of said remote device, wherein said remote device is a remote end station, and wherein said login information further includes information identifying a user of said remote end station;
   program code for extracting, responsive to said detecting of said login information, said end to end address associated with said network interface of said remote device from said login information;
   program code for identifying, responsive to said end to end address, an internetworking device communicably coupled to a remote network to which said network interface is also communicably coupled;
   program code for identifying, responsive to said end to end address, an interface of said internetworking device which is attached to said remote network; and
   program code for obtaining, responsive to said end to end network address, said point to point address of said network interface from a database of point to point addresses of network interfaces of devices that are communicably coupled to said remote network, wherein said database is associated with said interface of said internetworking device attached to said remote network.

* * * * *

UNITED STATES PATENT AND TRADEMARK OFFICE
CERTIFICATE OF CORRECTION

PATENT NO.    : 6,292,838 B1
DATED         : September 18, 2001
INVENTOR(S)   : William Joseph Nelson It is certified that error appears in the above-identified patent and that said Letters Patent is hereby corrected as shown below:

Column 2,
Line 29, "MA7" should read -- MAC --;
Line 32, "tie" should read -- the --;
Line 33, "timely-consuming" should read -- time-consuming --;

Column 4,
Line 49, "NDSTM" should read -- NDS$^{TM}$ --;
Line 65, "logic" should read -- login --;

Column 6,
Line 17, "if index" should read -- ifIndex --;
Line 20, "sees" should read -- seen --;
Line 32, "logic" should read -- login --;

Column 12,
Line 48, "ifindex" should read -- ifIndex --;
Line 64, "ifindex" should read -- ifIndex --;

Column 13,
Line 7, "ifindex" should read -- ifIndex --; and

Column 14,
Line 49, "rely" should read -- reply --.

Signed and Sealed this

Fourth Day of June, 2002

Attest:

Attesting Officer

JAMES E. ROGAN
*Director of the United States Patent and Trademark Office*